United States Patent [19]
Spence

[11] Patent Number: 6,038,966
[45] Date of Patent: Mar. 21, 2000

[54] APPARATUS FOR COOKING EGGS

[76] Inventor: Jonathan P. Spence, 215 N. Broad St., Grove City, Pa. 16127

[21] Appl. No.: 09/070,368

[22] Filed: Apr. 30, 1998

[51] Int. Cl.[7] .................................................. A22C 7/00
[52] U.S. Cl. ................................ 99/440; 99/336; 99/416
[58] Field of Search .............................. 476/614; 99/440, 99/453, 336, 416; 220/912

[56] References Cited

U.S. PATENT DOCUMENTS

| | | | |
|---|---|---|---|
| 451,166 | 4/1891 | Bryant . | |
| 1,063,609 | 6/1913 | Shaw et al. . | |
| 3,831,508 | 8/1974 | Wallard | 99/440 |
| 4,512,250 | 4/1985 | Schindler et al. | 426/614 |
| 4,522,117 | 6/1985 | Weimer et al. | 426/614 |
| 4,656,928 | 4/1987 | Mack | 99/440 |
| 5,662,027 | 9/1997 | Neville et al. | 99/440 |
| 5,678,474 | 10/1997 | Hall | 99/353 |

*Primary Examiner*—Anthony J. Weier
*Attorney, Agent, or Firm*—Webb Ziesenheim Logsdon Orkin & Hanson, P.C.

[57] ABSTRACT

An apparatus for cooking eggs includes a cover plate, a middle plate, a bottom plate, and a lock-down assembly. The lock-down assembly removably secures the middle plate between the cover plate and the bottom plate. A receiving pocket is provided in the bottom plate and a recess is provided in the middle plate such that with the middle plate located between the cover plate and the bottom plate an egg-receiving cavity is formed between the receiving pocket and the recess to house an egg to be cooked.

19 Claims, 5 Drawing Sheets

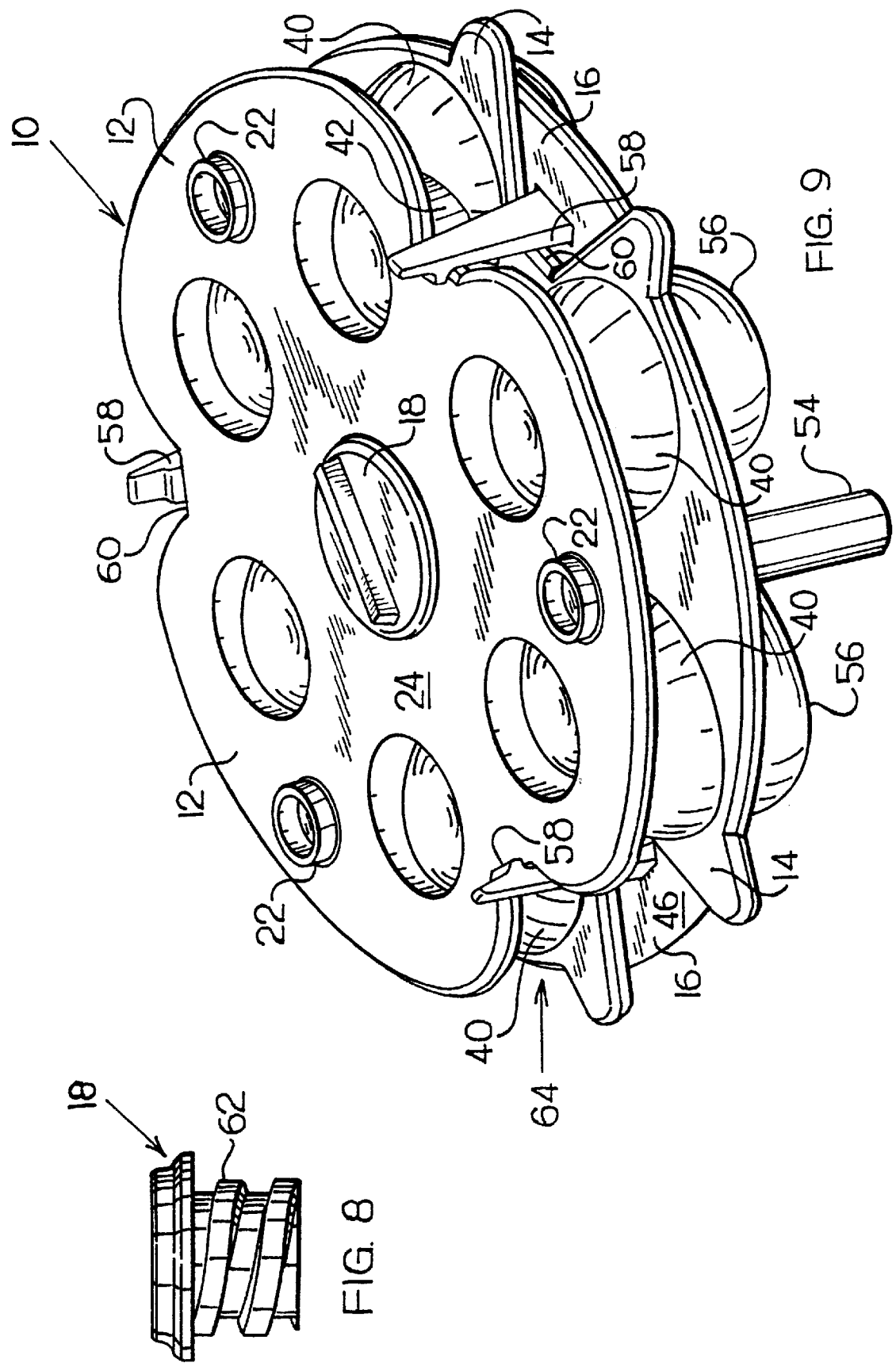

APPARATUS FOR COOKING EGGS

BACKGROUND OF THE INVENTION

1. Field of the Invention

This invention relates to a cooking apparatus and, more particularly, to an apparatus for cooking eggs and the like and a method of using the apparatus.

2. Description of the Prior Art

Large numbers of cooked eggs are used in domestic kitchens and the food service industry, particularly restaurants. Cooked eggs are served in many different forms, for example, hard-boiled, scrambled, poached, and as omelets. Currently, there is a need for a simple and economical way of preparing large quantities of cooked eggs of all types.

One current food service practice is to buy hard-boiled eggs in five gallon buckets. The eggs are cooked and preserved in a preservative solution, such as formaldehyde. There are certain disadvantages with procuring cooked eggs in this manner. First, cooked eggs preserved in formaldehyde and similar solutions retain an unpleasant taste due to the preservative solution. Further, the eggs cooked and preserved in the conventional manner often require a labor intensive de-shelling procedure before the eggs can be used by the restaurant. Additionally, procuring hard-boiled eggs in five gallon buckets filled with formaldehyde prevents restaurants from serving "freshly" cooked eggs.

It is therefore an object of the present invention to overcome the above-discussed disadvantages by providing an apparatus for cooking hard-boiled eggs and the like, suitable for providing commercial quantities of freshly cooked eggs.

It is a further object of the present invention to provide a method for using the apparatus for cooking eggs.

SUMMARY OF THE INVENTION

The foregoing objective is accomplished with an apparatus for cooking eggs and a method of using the apparatus disclosed hereinafter. The apparatus preferably includes a first plate, a second plate, and a lock-down assembly. The first plate preferably includes at least one recess, the at least one recess having a first side and a second side. The second plate preferably includes at least one receiving pocket and preferably has a first side and a second side.

The lock-down assembly is preferably configured to removably secure the first plate to the second plate such that the at least one recess in the first plate substantially aligns with the at least one receiving pocket in the second plate to form at least one cavity therebetween. The at least one cavity is preferably adapted to receive an egg.

The apparatus preferably includes a cover plate removably secured to the first plate by the lock-down assembly. The cover plate is preferably secured to the first plate by the lock-down assembly such that the first plate is received between the cover plate and the second plate. The cover plate preferably includes a first side and a second side.

The second plate preferably includes a sleeve extending from the first side adapted to be received through an aperture in each of the cover plate and the first plate. The lock-down assembly preferably includes a shaft configured to removably engage the sleeve extending from the second plate. The shaft of the lock-down assembly can be threaded and the sleeve can include internal threads such that the shaft of the lock-down assembly cooperates with the internal threads of the sleeve to removably secure the first plate between the cover plate and the second plate.

The cover plate preferably includes at least one projection extending from the second side. Further, the first plate preferably includes at least one projection receiver extending from the second side of the at least one recess. The at least one projection receiver is preferably adapted to removably receive the at least one projection extending from the second side of the cover plate when the first plate is received between the cover plate and the bottom plate. The at least one projection can include a bearing surface at a distal end thereof adapted to engage the second side of the at least one recess in the first plate. The bearing surface can include a saddle shape for engaging the second side of the at least one recess in the first plate.

The second plate preferably includes at least one elastically deformable tab extending from the first side and configured to hold down an outer edge of the cover plate and the first plate in engagement with an outer edge of the second plate. Further, the cover plate preferably includes at least one leg receiving cup and the second plate preferably includes at least one leg extending from the second side of the second plate. The at least one leg extending from the second plate is preferably adapted to friction fit within the at least one leg receiving cup in the cover plate.

The cover plate, the first plate, the second plate, and the lock-down assembly are preferably injection molded and may be made of any one of the following materials: polypropylene, polycarbonate, stainless steel or any other food grade material. The cover plate, the first plate and the second plate preferably have a thickness of between about 0.125 and 0.130 inches. Steam relief vents can be provided in the at least one recess in the first plate.

The process for using the apparatus for cooking eggs preferably comprises the steps of:

providing an apparatus for cooking which includes a first plate having at least one recess, the at least one recess having a first side and a second side, a second plate having at least one receiving pocket and a lock-down assembly configured to removably secure the first plate to the second plate such that the at least one recess in the first plate substantially aligns with the at least one receiving pocket in the second plate; placing the contents of an egg within the at least one receiving pocket in the second plate; removably securing the first plate to the second plate with the lock-down assembly such that at least one cavity is formed between the at least one recess in the first plate and the at least one receiving pocket in the second plate, the at least one cavity housing the contents of the egg; and applying heat to the apparatus to cook the contents housed within the at least one cavity. The process preferably also includes the additional step of stacking the apparatus on a second identically formed apparatus for cooking eggs prior to applying heat. The step of applying heat to the apparatus to cook the contents housed within the at least one cavity preferably includes submersing the apparatus in boiling water. The process preferably includes the step of holding the center and outer edge of the first plate in engagement with the center and outer edge of the second plate with the lock-down assembly to removably secure the first plate to the second plate. Additionally, the process preferably includes the step of injection molding the first plate, the second plate and the lock-down assembly. Finally, the process preferably includes the step of applying pressure to the second side of the at least one recess with the lock-down assembly to removably secure the first plate to the second plate.

Further details and advantages of the invention will become apparent from the following detailed description, in conjunction with the drawings.

BRIEF DESCRIPTION OF THE DRAWINGS

FIG. 8 is a front elevational view showing a lock-down assembly of the apparatus for cooking eggs shown in FIG. 1; and FIG. 9 is a top perspective view showing an assembled apparatus for cooking eggs, according to the present invention.

DETAILED DESCRIPTION OF THE PREFERRED EMBODIMENTS

Figure 1:
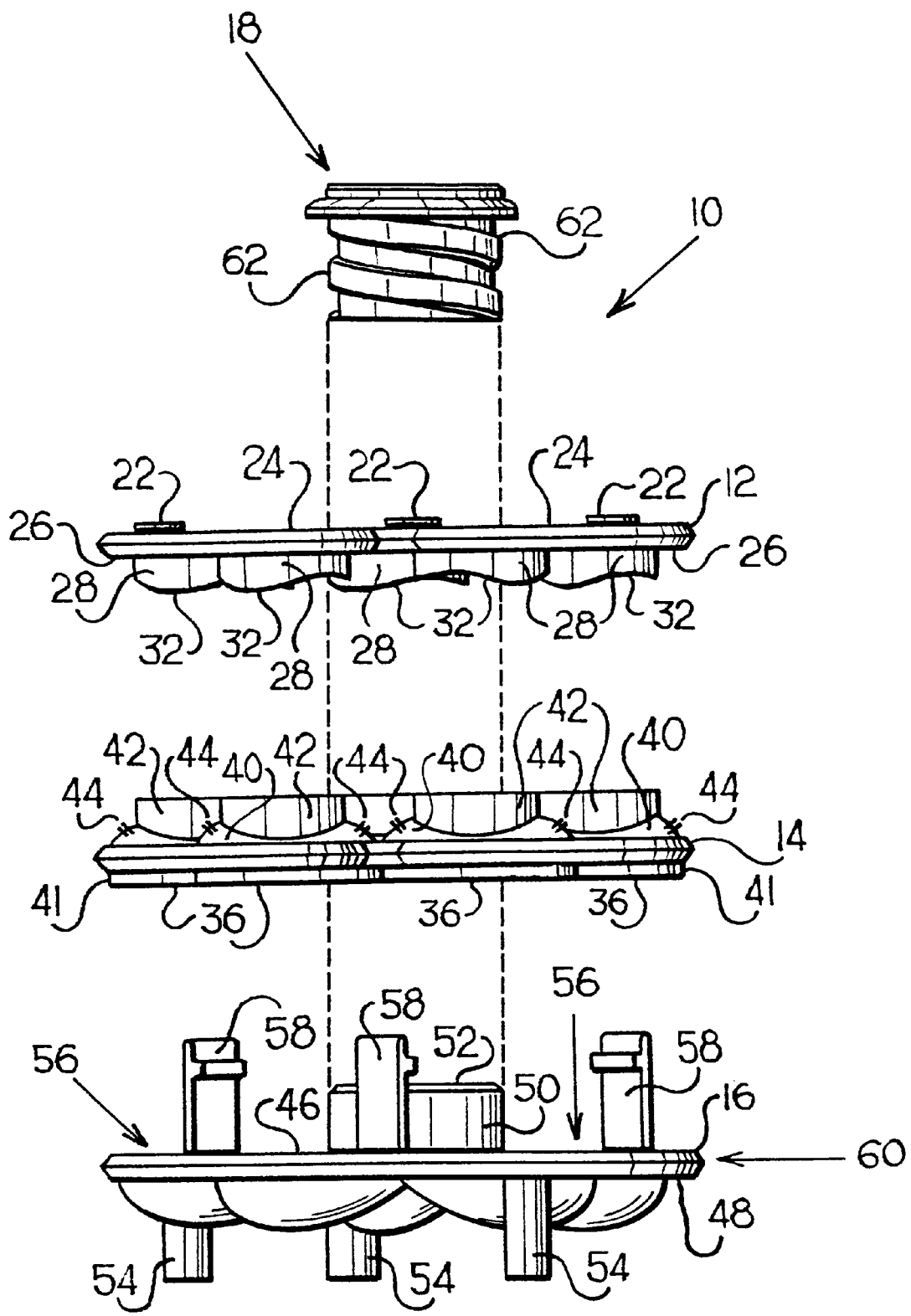
FIG. 1 is an exploded front elevational view of an apparatus for cooking eggs in accordance with the present invention.

FIG. 1 shows an apparatus 10 for cooking eggs made in accordance with the present invention that includes a cover plate 12, a middle plate 14, a bottom plate 16, and a lock-down assembly 18.

Figure 2:
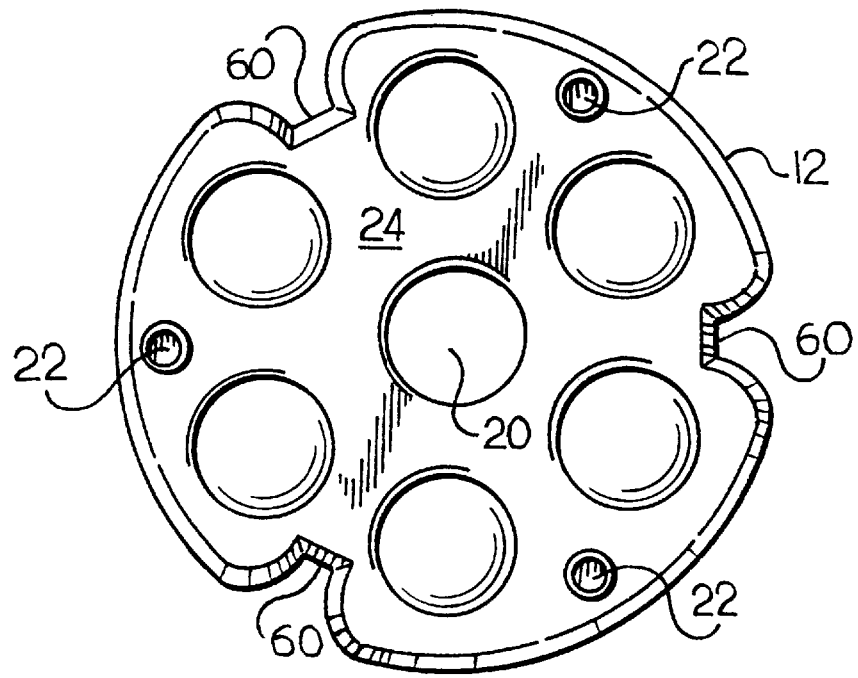
FIG. 2 is a plan view of a cover plate of the apparatus for cooking eggs shown in FIG. 1.
Figure 3:
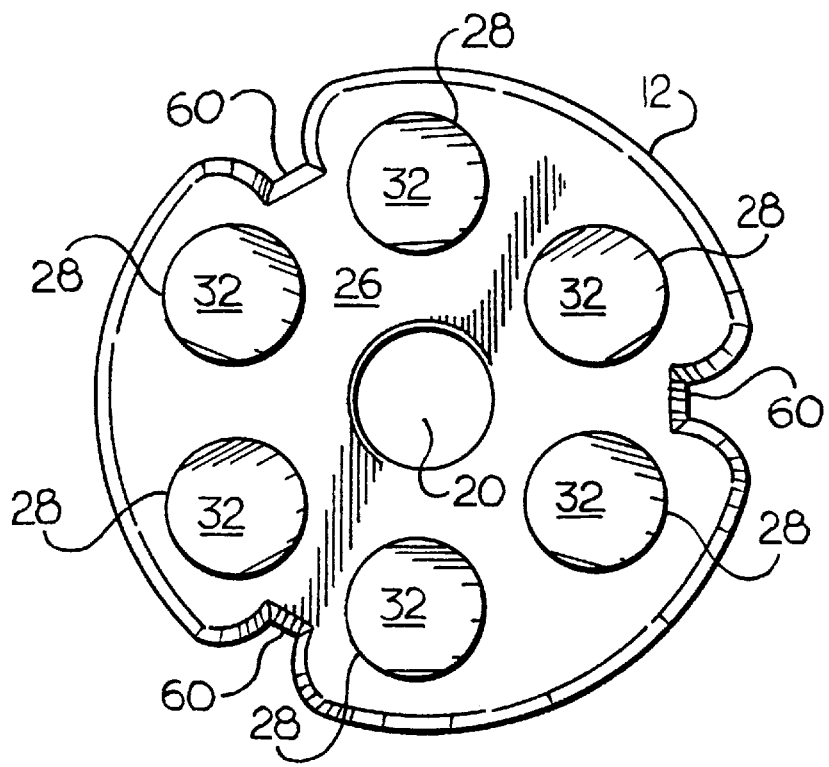
FIG. 3 is a bottom view of the cover plate shown in FIG. 2.

FIGS. 2 and 3 show the cover plate 12 of the apparatus 10. The cover plate 12 has a central aperture 20 and three leg receiving cups 22 radially spaced from the aperture 20. The cover plate 12 has a first or top side 24 and a second or bottom side 26. Additionally, the cover plate 12 includes six projections 28 extending from the second side 26. The projections 28, at a distal end 30 thereof, have a saddle-shaped bearing surface 32.

Figure 4:
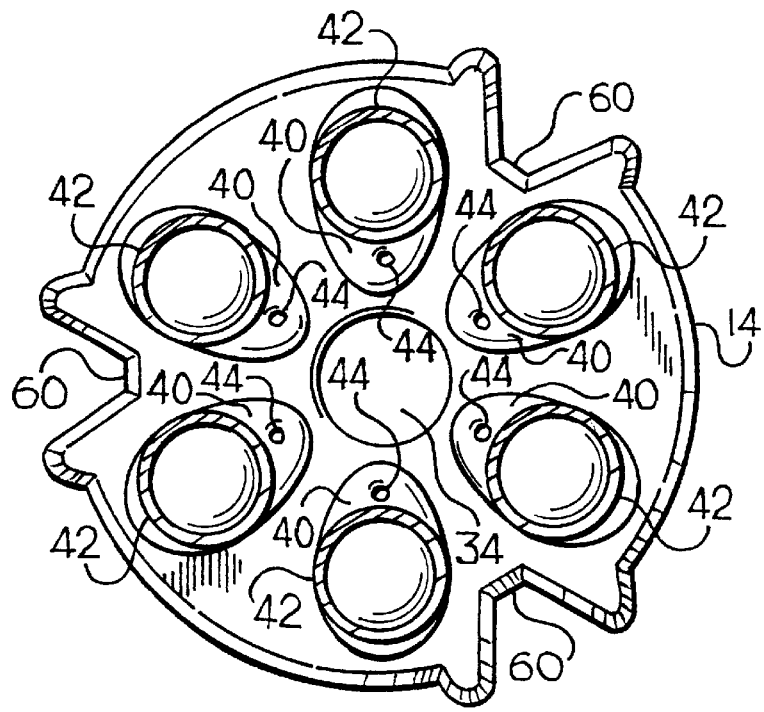
FIG. 4 is a plan view of a middle plate of the apparatus for cooking eggs shown in FIG. 1.
Figure 5:
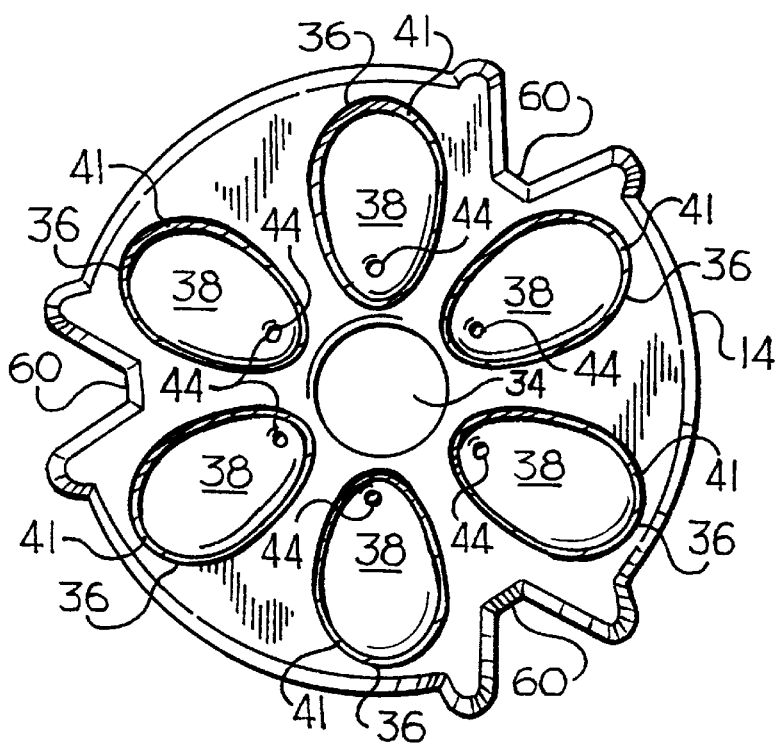
FIG. 5 is a bottom view of the middle plate shown in FIG. 4.

FIGS. 4 and 5 show the middle plate 14 of the apparatus 10. The middle plate 14 has a central aperture 34 defined therethrough, with six egg-shaped recesses 36 defined in the middle plate 14 and radially spaced from the central aperture 34. The recesses 36 have a first or inner side 38 and a second or outer side 40. A depending lip 41 extends from the first side 38 of the recesses 36 at a circumferential outer edge of each of the recesses 36. Additionally, the middle plate 14 has six projection receivers 42 extending from the second side 40 of the recesses 36. The projection receivers 42 are adapted to removably receive the projections 28 extending from the second side 26 of the cover plate 12. The middle plate 14 further includes steam relief vents 44 in the recesses 36.

Figure 6:
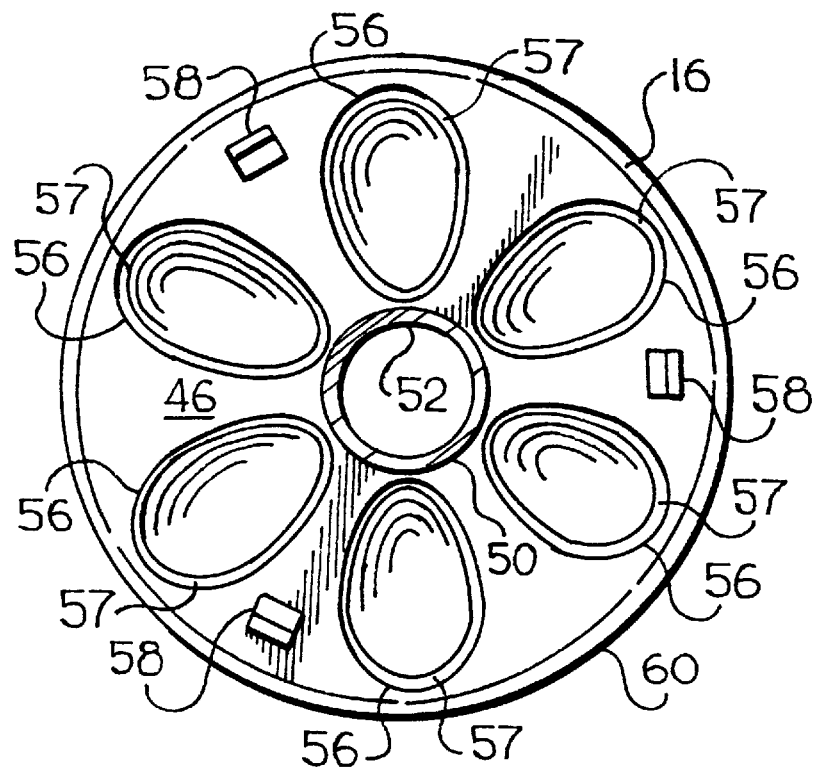
FIG. 6 is a plan view of a bottom plate of the apparatus for cooking eggs shown in FIG. 1.
Figure 7:
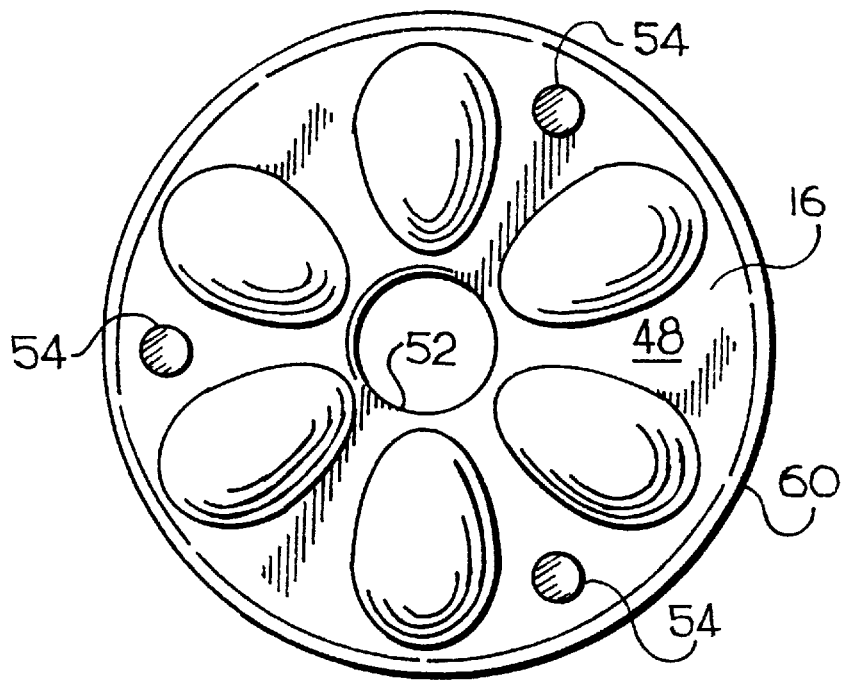
FIG. 7 is a bottom view of the bottom plate shown in FIG. 6.

FIGS. 6 and 7 show the bottom plate 16 of the apparatus 10. The bottom plate 16 has a first or top side 46 and a second or bottom side 48. The bottom plate 16 has a sleeve 50 extending from the first side 46 of the bottom plate 16. The sleeve 50 is adapted to pass through the central apertures 20, 34 in the cover plate 12 and the middle plate 14, respectively. The sleeve 50 includes internal threads 52. The bottom plate 16 further includes stacking legs 54 extending from the second side 48 of the bottom plate 16 adapted to support the apparatus 10. The legs 54 support the apparatus 10 on flat surfaces and are adapted to friction fit within the leg receiving cups 22 in the cover plate 12 for stacking.

Additionally, the bottom plate 16 has six egg-shaped receiving pockets 56 defined in the first side 46 of the bottom plate 16 and spaced radially from the sleeve 50. The receiving pockets 56 each include a countersink 57 configured to cooperate with the lips 41 extending from the first side 38 of the recesses 36 in the middle plate 14. Also, the bottom plate 16 includes three elastically deformable tabs 58 extending from the first side 46 of the bottom plate 16. The tabs 58 are configured to hold down an outer edge 60 of the cover plate 12 and the middle plate 14 and place them into engagement with an outer edge 60 of the bottom plate 16.

FIG. 8 shows a preferred embodiment of the lock-down assembly 18 of the apparatus 10. The lock-down assembly 18 includes a threaded shaft 62. The threaded shaft 62 is adapted to removably engage the internal threads 52 of the sleeve 50 extending from the first or top side 46 of the bottom plate 16. Alternatively, the lock-down assembly 18 can be formed with a shaft adapted for an interference fit within the sleeve 50 instead of a threaded engagement. Further, the lock-down assembly 18 can be formed as a plurality of clips, clamps, or other similar coupling devices arranged around the outer edge 60 of the cover plate 12, the middle plate 14, and the bottom plate 16. The lock-down assembly 18 is configured to secure in removable engagement the center and outer edges 60 of the cover plate 12, middle plate 14, and bottom plate 16.

In a preferred embodiment, the cover plate 12, the middle plate 14, and the bottom plate 16 each have a thickness of between about 0.125 and 0.130 inches and can be formed by injection molding. Additionally, the cover plate 12, the middle plate 14, the bottom plate 16, and the lock-down assembly 18 are preferably made from any one of a number of food grade materials, including polypropylene, polycarbonate, or stainless steel.

Referring to FIGS. 1 and 9, assembly and operation of the apparatus 10 for cooking eggs will now be described. The apparatus 10 is used by placing the contents of the eggs to be cooked within the receiving pockets 56 defined in the first side 46 of the bottom plate 16. The sleeve 50 extending from the first side 46 of the bottom plate 16 passes through the central apertures 20, 34 in the cover plate 12 and the middle plate 14 such that the recesses 36 in the middle plate 14 substantially align with the receiving pockets 56 in the bottom plate 16. The middle plate 14 is thereby located between the cover plate 12 and the bottom plate 16, and the sleeve 50 projects out of the central aperture 20 in the cover plate 12. Egg receiving cavities 64 are formed between the recesses 36 in the middle plate 14 and the receiving pockets 56 in the bottom plate 16.

With the middle plate 14 located between the cover plate 12 and bottom plate 16, the countersinks 57 defined in the receiving pockets 56 cooperate with the lips 41 extending from the first side 38 of the recesses 36. Additionally, the cylindrically-shaped projection receivers 42 extending from the second side 40 of the recesses 36 in the middle plate 14 removably receive the projections 28 extending from the second or bottom side 26 of the cover plate 12. Particularly, the projection receivers 42 receive the projections 28 and the saddle-shaped bearing surfaces 32 at the distal end 30 of each of the projections 28 engage the second side 40 of the recesses 36.

The threaded shaft 62 of the lock-down assembly 18 engages the internal threads 52 of the sleeve 50. The threaded shaft 62 of the lock-down assembly 18 removably engages the internal threads 52 of the sleeve 50 to secure the middle plate 14 between the cover plate 12 and the bottom plate 16. The lock-down assembly 18 thereby secures in removable engagement the center and outer edges 60 of the cover plate 12, the middle plate 14, and the bottom plate 16.

The elastically deformable tabs 58 extending from the first or top side 46 of the bottom plate 16 engage the first or top side 24 of the cover plate 12 at its outer edge 60. The outer edges 60 of the cover plate 12 and the middle plate 14 are thereby held down in engagement with the outer edge 60 of the bottom plate 16. The assembled first embodiment of the apparatus is submerged in boiling water to cook the eggs housed in the cavities 64, or the apparatus 10 may be placed in a microwave oven or similar heating appliance.

In operation, the assembled first embodiment of the apparatus 10 cooperates with additional, identically formed apparatus for cooking eggs such that a large number of eggs can be cooked at one time. The apparatus 10 cooperates with a second identically formed apparatus by placing the stacking legs 54 within the leg receiving cups in the cover plate of the second apparatus such that the apparatus 10 is stacked on top of the second apparatus. The stacking legs 54 of the apparatus 10 may be dimensioned to friction fit within the leg receiving cups in the cover plate of the second apparatus. Similarly, additional apparatus for cooking eggs can be stacked on the cover plate 12 of the apparatus 10 according to the method described above.

In an alternative embodiment (not shown), the cover plate 12 is dispensed with such that the apparatus 10 for cooking eggs includes a middle or first plate 14, a bottom or second plate 16, and a lock-down assembly 18 as described above. The lock-down assembly 18 is configured to secure in removable engagement the center and outer edges 60 of the first plate 14 and second plate 16 as described above. The middle or first plate 14 can be configured without the projection receivers 42 extending from the second side 40 of the recesses 36. The middle or first plate 14 may be provided with the leg receiving cups 22 found on the first or top side 24 of the cover plate 12 of the first embodiment. The leg receiving cups 22 are similarly positioned on the first plate 14 as described above for the cover plate 12 of the first embodiment of the invention.

The alternative embodiment is assembled and operated in a similar manner to the method described above, with the exceptions that: the sleeve 50 passes through the aperture 34 in the first plate 14 only; the projection receivers 42, if provided, no longer receive the projections 28 extending from the cover plate 12; the elastically deformable tabs 58 extending from the first side 46 of the second plate 16 engage the first or top side 24 of the first plate 14 to hold down the outer edge 60 of the first plate 14 in engagement with the outer edge 60 of the second plate 16; and the stacking legs 54 cooperate with the leg receiving cups positioned on the first plate of a second identically formed apparatus.

While the preferred embodiments and presently best known modes of the invention have been described above, various modifications and variations of the invention may be made without departing from the spirit and scope of the invention.

What is claimed is:

1. An apparatus for cooking eggs, comprising:
   a first plate including at least one recess, the at least one recess having a first side and a second side;
   a second plate including at least one receiving pocket, the second plate having a first side and a second side;
   a lock-down assembly, the lock-down assembly configured to removably secure the first plate to the second plate such that the at least one recess in the first plate substantially aligns with the at least one receiving pocket in the second plate to form at least one cavity to receive an egg; and
   a cover plate removably secured to the first plate by the lock-down assembly such that the first plate is located between the cover plate and the second plate, the cover plate having a first side and a second side, with the second side of the cover plate facing the first plate,
   wherein the cover plate includes at least one projection extending from the second side of the cover plate, and
   wherein the second side of each recess in the first plate, is adapted to removably receive the at least one projection extending from the second side of the cover plate.

2. The apparatus of claim 1 wherein the second plate includes a sleeve extending from the first side, wherein the cover plate and the first plate each include an aperture, and wherein the lock-down assembly includes a shaft configured to removably engage the sleeve extending from the second plate, with the sleeve passing through the aperture in each of the cover plate and the first plate, and with the shaft of the lock-down assembly engaging the sleeve such that the first plate is removably secured between the cover plate and the second plate.

3. The apparatus of claim 2 wherein the sleeve includes internal threads.

4. The apparatus of claim 3 wherein the shaft of the lock-down assembly includes threads configured to removably engage the internal threads of the sleeve.

5. The apparatus of claim 1 wherein the at least one projection includes a bearing surface at a distal end thereof adapted to engage the second side of the recess in the first plate.

6. The apparatus of claim 5 wherein the bearing surface includes a saddle shape.

7. The apparatus of claim 1 wherein the second plate includes at least one elastically deformable tab extending from the first side of the second plate and configured to engage the first side of the cover plate, and wherein the tab holds the cover plate in engagement with the first plate and the first plate in engagement with the second plate when the tab is in engagement with the first side of the cover plate.

8. The apparatus of claim 1 wherein the first plate includes a steam relief vent in the at least one recess.

9. The apparatus of claim 1 wherein the cover plate includes at least one leg receiving cup formed in the first side of the cover plate, and wherein the second plate includes at least one leg extending from the second side of the second plate.

10. The apparatus of claim 1 wherein the cover plate, the first plate, the second plate, and teh lock-down assembly are injection molded.

11. The apparatus of claim 1 wherein the cover plate, the first plate, the second plate, and the lock-down assembly are made from a material selected from the group consisting of polypropylene, polycarbonate, and stainless steel.

12. The apparatus of claim 1 wherein the cover plate, the first plate, and the second plate have a thickness of between about 0.125 and 0.130 inches.

13. An apparatus for cooking eggs, comprising:
   a cover plate having a first side and a second side, the cover plate including at least one projection extending from the second side, the at least one projection having a bearing surface at a distal end thereof, the cover plate including a central aperture and at least one leg receiving cup formed in the first side of the cover plate radially spaced from the aperture;

a middle plate having at least one egg-shaped recess, the at least one recess having a first side and a second side, the middle plate including at least one projection receiver extending from the second side of the at least one recess, the at least one projection receiver adapted to removably receive the at least one projection extending from the second side of the cover plate, the middle plate further including a central aperture;

a bottom plate defining at least one egg-shaped receiving pocket, the bottom plate including a first side and a second side, the bottom plate having a sleeve extending from the first side and at least one leg extending from the second side, the sleeve configured to pass through the central aperture in each of the middle plate and the cover plate such that the middle plate is located between the cover plate and the bottom plate and such that the at least one recess in the middle plate is substantially aligned with the at least one receiving pocket in the bottom plate to form at least one egg receiving cavity, wherein the at least one projection receiver extending from the middle plate removably receives the at least one projection extending from the cover plate; and a lock-down assembly having a shaft, the shaft of the lock-down assembly configured to removably engage the sleeve extending from the bottom plate such that the middle plate is removably secured between the cover plate and the bottom plate.

14. The apparatus of claim 13 wherein the sleeve includes internal threads.

15. The apparatus of claim 14 wherein the shaft of the lock-down assembly includes threads configured to removably engage the internal threads of the sleeve.

16. The apparatus of claim 13 wherein the at least one projection includes a bearing surface at a distal end thereof adapted to engage the second side of the at least one recess in the middle plate.

17. The apparatus of claim 16 wherein the bearing surface includes a saddle shape.

18. The apparatus of claim 13 wherein the bottom plate includes at least one elastically deformable tab extending from the first side of the bottom plate and configured to engage the first side of the cover plate, and wherein the at least one tab holds the cover plate in engagement with the middle plate and the middle plate in engagement with the bottom plate when the at least one tab is in engagement with the first side of the cover plate.

19. The apparatus of claim 13 wherein the middle plate includes a steam relief vent in the at least one recess.

* * * * *